United States Patent Office 3,068,237
Patented Dec. 11, 1962

3,068,237
N-[(CHLORO/NITRO/AMINO)PHENYLAL-
KYL]-α,α-DIPHENYLPIPERIDINEMETH-
ANOLS
Kurt J. Rorig, Glenview, Ill., assignor to G. D. Searle &
Co., Chicago, Ill., a corporation of Delaware
No Drawing. Filed Mar. 17, 1961, Ser. No. 96,346
12 Claims. (Cl. 260—294.7)

This invention relates to N - [(halo/nitro/amino)-phenylalkyl] - α,α - diphenylpiperidinemethanols and processes for the manufacture thereof. More particularly, this invention relates to chemical compounds of the formula

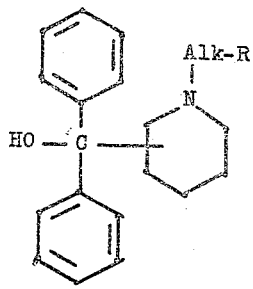

wherein R represents a phenyl radical substituted by halogen (F, Cl, Br, I) or a nitro ($NO_2$) or amino ($NH_2$) radical, and Alk represents an alkylene radical.

The application for Letters Patent securing the invention herein described and claimed is a continuation-in-part of applicant's prior copending applications Serial Nos. 692,031, filed October 24, 1957, and 692,569, filed October 28, 1957, both of which applications are now abandoned.

Among the halogen-substituted phenyl radicals comprehended by R in the foregoing formula, those wherein one or more chlorine atoms appear are preferred, for example, o - chlorophenyl, m - chlorophenyl, p - chlorophenyl, 2,4 - dichlorophenyl, 2,5 - dichlorophenyl, 3,4-dichlorophenyl, 2,4,5 - trichlorophenyl, 2,4,6 - trichlorophenyl, perchlorophenyl, etc., and of the various polychlorophenyl radicals contemplated, those containing fewer than four chlorine atoms are, together with (mono) chlorophenyl radicals, optimally adapted to the purposes hereinafter set forth. Similarly, the nitro-substituted and amino-substituted phenyl radicals comprehended by R embrace either one or a plurality of nitro and amino groups, respectively, but (mono)nitrophenyl and (mono)-aminophenyl radicals are especially advantageous.

As to the alkylene radicals designated above by Alk, these are desirably lower alkylene radicals, which is to say bivalent saturated acyclic straight- or branched-chain hydrocarbon groupings containing fewer than nine carbon atoms and exemplified by methylene, ethylene, trimethylene, 1,2-propylene, tetramethylene, 2,2-dimethyl-1,3-propylene, and like $C_nH_{2n}$ moieties among which, however, lower alkylene radicals containing fewer than three carbon atoms are preferred.

It will be noted from the general formula reproduced that the position of the α,α-diphenylmethanolic constitu-

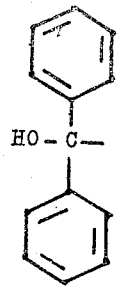

ent in the piperidine ring, like the positioning of the halo, nitro, and amino constituents of the substituted phenyl radical represented by R, is without critical significance, ortho, meta, or para attachment to carbon all being within the scope of the invention. Notwithstanding, the N - halo - phenylalkyl - α,α - diphenyl - 4 - piperidinemethanols hereof are products of choice.

Equivalent to the basic amino alcohols of the invention for the purposes described are non-toxic acid addition and quaternary ammonium salts thereof, the compositions of which may be symbolized by

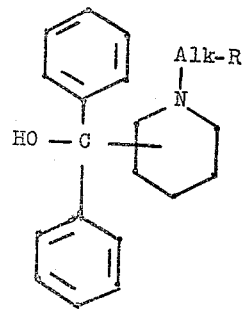

•(QT)$_x$ wherein R and Alk have the meanings hereinbefore assigned; Q is selected from among hydrogen and lower alkyl, hydroxy-(lower alkyl), and lower alkenyl radicals, as also such aralkyl radicals as benzyl, phenethyl, and naphthylmethyl; T is one equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which, in combination with the cationic portion of a salt aforesaid, is neither pharmacologically nor otherwise undesirable in physiological dosage; and x is a positive integer not greater than two. The lower alkyl radicals referred to are methyl, ethyl, propyl, isopropyl, butyl, isobutyl, sec-butyl, tert-butyl, pentyl, isopentyl, tert-pentyl, neopentyl, hexyl, isohexyl, heptyl, octyl, and homologous monovalent hydrocarbon groupings embracive of fewer than nine carbon atoms arranged in chains, either straight or branched. Groupings otherwise the same as these but including a hydroxy substituent or a double bond constitute the hydroxy(lower alkyl) and alkenyl radicals designated.

The compounds of this invention are useful because of their valuable pharmacological properties. For example, the subject compositions manifest an unexpected capacity to potentiate barbiturate sleeping time in mammals without the concomitant production of other central nervous effects ordinarily associated with such activity.

The claimed N - (halo/nitro)phenylalkyl compositions are manufactured by condensation of a selected $\alpha,\alpha$-diphenyl-piperidinemethanol with an appropriate N-(halo/nitro)phenyl-alkyl halide $$R'—Alk—X$$

under the influence of an anhydrous alkaline catalyst in the presence of oxygenated solvent, Alk in the formula for the halide being defined as above, R' representing a phenyl radical substituted by halogen or a nitro grouping, and X representing chlorine or bromine. From the nitro compounds which result, on hydrogenation in the presence of platinum oxide or equivalent catalyst, the claimed amino compounds are obtained.

Conversion of the free bases of this invention to corresponding acid addition salts is accomplished by simple admixture thereof with one or, if a diamine, optionally two equivalents of any of various inorganic and strong organic acids, the anionic portion of which conforms to T as hereinbefore defined.

The quaternary ammonium compounds comprehended are those derived by contacting a claimed base with an organic ester of the formula $$Q—T$$

Q and T being limited by the meanings hereinabove assigned. When the quaternized base is a diamine, either one or two Q—T aggregates may be incorporated. Quaternization takes place in the temperature range between 25° and 100° centigrade, using an inert solvent such as chloroform, acetone, butanone, methanol, butanol, or the like as reaction medium. Quaternization is ordinarily completed in from 1 to 48 hours and is generally carried out in a closed system if a lower alkyl halide—such as methyl chloride—is one of the reagents. Using methyl bromide, the manufacture of quaternary salts may be smoothly effected in butanone solution at 70° centigrade, the reaction time being approximately one hour.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade, pressure in pounds per square inch, and relative amounts of materials in parts by weight, except as otherwise noted.

EXAMPLE 1

*N-(m-chlorobenzyl) - $\alpha,\alpha$ - diphenyl-4-piperidinemethanol hydrochloride.*—A mixture of 13 parts of $\alpha,\alpha$-diphenyl-4-piperidinemethanol, 10 parts of m-chlorobenzyl bromide, 5 parts of powdered potassium carbonate, and 80 parts of butanone is heated at the boiling point with agitation under reflux in the presence of a trace of sodium iodide for a total of 27 hours. Solvent is then evaporated and the residue taken up in chloroform. The chloroform extract is washed with water, and then with hydrochloric acid, following which it is dried over anhydrous calcium sulfate, treated with decolorizing charcoal, and concentrated by evaporation until a precipitate starts to form. Precipitation is completed by chilling the chloroform concentrate. The product thus thrown down is N-(m-chlorobenzyl)-$\alpha,\alpha$-diphenyl-4-piperidine-methanol hydrochloride, which melts at approximately 203–204°, and has the formula

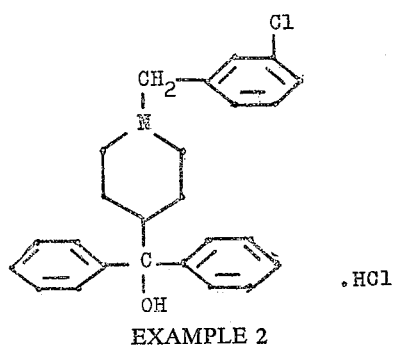

EXAMPLE 2

*N-(o-chlorobenzyl)-$\alpha,\alpha$-diphenyl-4-piperidinemethanol hydrochloride.*—Using the procedure of Example 1, but substituting 8 parts of o-chlorobenzyl chloride for the m-chlorobenzyl bromide therein there is obtained N-(o-chlorobenzyl)-$\alpha,\alpha$-diphenyl-4-piperidinemethanol hydrochloride. The product does not precipitate from the chloroform extract on concentration and chilling, but rather is isolated by evaporation of all chloroform solvent, leaving an oil which crystallizes on standing. The material thus obtained can be further purified by recrystallization from a mixture of ethanol and ether. N-(o-chlorobenzyl)-$\alpha,\alpha$-diphenyl-4-piperidinemethanol hydrochloride melts at 231–233°, with gas evolution, and has the formula

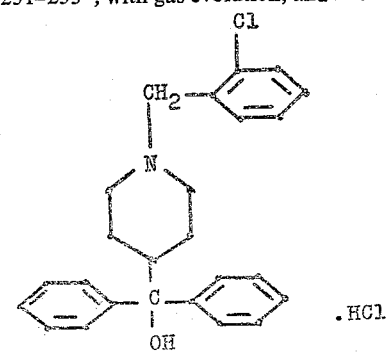

EXAMPLE 3

*N - (p-chlorobenzyl)-$\alpha,\alpha$-diphenyl-4-piperidinemethanol hydrochloride.*—A mixture of 20 parts of $\alpha,\alpha$-diphenyl-4-piperidinemethanol, 13 parts of p-chlorobenzyl chloride, 10 parts of powdered potassium carbonate, 80 parts of butanone, and a trace of sodium iodide is processed essentially according to the technique of Example 2 to give pure white, crystalline N-(p-chlorobenzyl)-$\alpha,\alpha$-diphenyl-4-piperidinemethanol hydrochloride, the melting point of which is approximately 202.5–204°. The product has the formula

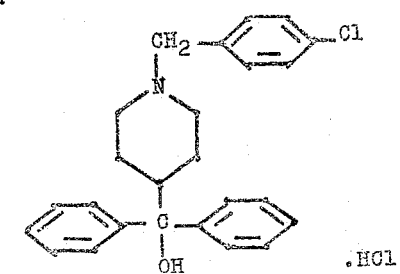

EXAMPLE 4

*N-(p - chlorobenzyl)-$\alpha,\alpha$-diphenyl - 3 - piperidinemethanol.*—A mixture of 20 parts of $\alpha,\alpha$-diphenyl-3-piperidinemethanol, 13 parts of p-chlorobenzyl chloride, 10 parts of powdered potassium carbonate, 80 parts of butanone, and a trace of sodium iodide is heated with agitation at the boiling point under reflux for 24 hours. Solvent is then stripped by crystallization and the residue taken up in chloroform. The chloroform solution is thoroughly washed with water, dried over anhydrous sodium sulfate, and finally treated with decolorizing charcoal. Upon evaporation of solvent, there is obtained the desired N-(p-chlorobenzyl)-α,α-diphenyl-3-piperidinemethanol, which has the formula

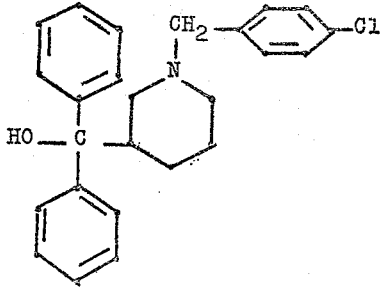

EXAMPLE 5

*N - (p-chlorobenzyl)-α,α-diphenyl - 2-piperidinemethanol hydrochloride.*—A mixture of 13 parts of α,α-diphenyl-2-piperidinemethanol, 8 parts of p-chlorobenzyl chloride, 5 parts of powdered potassium carbonate, and 80 parts of butanone is heated at the boiling point with agitation under reflux in the presence of a trace of sodium iodide for 24 hours, whereupon solvent is evaporated and the residue taken up in chloroform. The chloroform extract is washed with water and then with hydrochloric acid, following which it is dried over anhydrous calcium sulfate and freed of chloroform by vacuum distillation. The white crystalline residue is recrystallized from a mixture of methanol and ether. The product thus isolated is N-(p-chlorobenzyl)-α,α-diphenyl-2-piperidinemethanol hydrochloride, melting at approximately 265° (with gas evolution) and having the formula

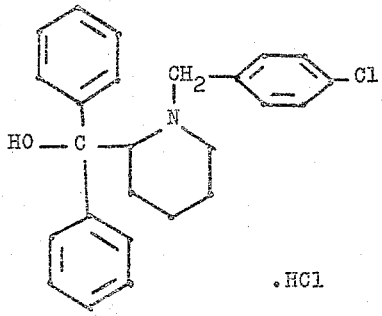

EXAMPLE 6

*N-(3,4-dichlorobenzyl)-α,α-diphenyl - 4 - piperidinemethanol hydrochloride.*—A mixture of 20 parts of α,α-diphenyl-4-piperidinemethanol, 15 parts of 3,4-dichlorobenzyl chloride, 10 parts of powdered potassium carbonate, 160 parts of butanone, and a trace of sodium iodide is processed essentially according to the technique of Example 2 to give pure white, crystalline N-(3,4-dichlorobenzyl)-α,α - diphenyl-4-piperidinemethanol hydrochloride, which melts at 217–219°, and has the formula

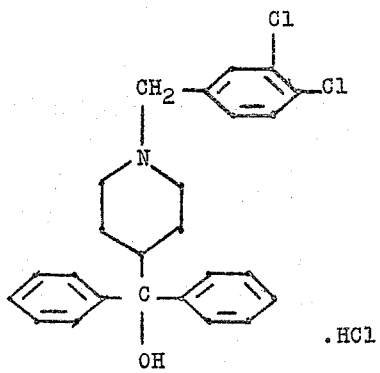

EXAMPLE 7

*N-(α'-methyl - 3,4 - dichlorobenzyl)-α,α - diphenyl-4-piperidinemethanol.*—A mixture of 20 parts of α,α-diphenyl-4-piperidinemethanol, 17 parts of 3,4-dichloro-α-methylbenzyl chloride, 175 parts of butanone, 12 parts of powdered potassium carbonate, and a trace of sodium iodide is heated with agitation at the boiling point under reflux for 30 hours. Solvent is then stripped by distillation and the residue taken up in chloroform. The chloroform solution washed with copious quantities of water, is dried over sodium sulfate and treated with decolorizing charcoal. Upon evaporation of solvent, there is obtained the desired N-(α'-methyl-3,4-dichlorobenzyl)-α,α-diphenyl-4-piperidinemethanol, which has the formula

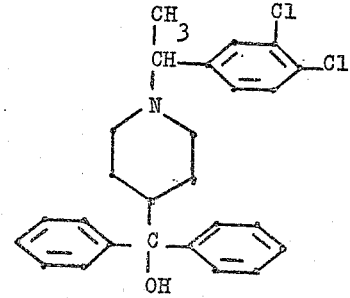

EXAMPLE 8

*N-(2,4-dichlorobenzyl) - α,α-diphenyl - 4 - piperidinemethanol hydrochloride.*—A mixture of 20 parts of α,α-diphenyl-4-piperidinemethanol, 15 parts of 2,4-dichlorobenzyl chloride, 160 parts of butanone, 10 parts of powdered potassium carbonate, and a trace of sodium iodide is processed essentially in accordance with the technique of Example 2 to give pure white N-(2,4-dichlorobenzyl)-α,α - diphenyl-4-piperidinemethanol hydrochloride, the melting point of which is 206–208°. The product has the formula

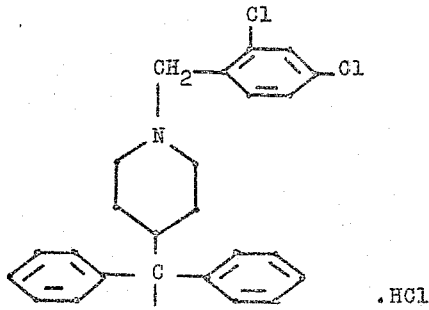

EXAMPLE 9

*N-(2,4,5-trichlorobenzyl)-α,α - diphenyl 4 - piperidinemethanol.*—Substitution of 20 parts of α,α-diphenyl-4-piperidinemethanol and 19 parts of 2,4,5-trichlorobenzyl chloride for the α,α-diphenyl-3-piperidinemethanol and p-chlorobenzyl chloride, respectively, called for in Example 4 affords, by the procedure there detailed, N-(2,4,5-trichlorobenzyl)-α,α-diphenyl-4 - piperidinemethanol, of the formula

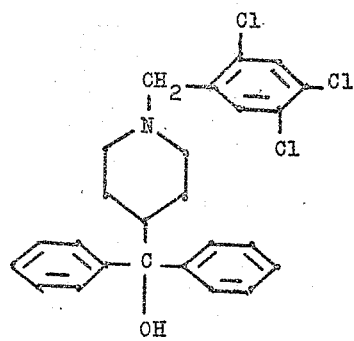

EXAMPLE 10

*N - (o-nitrobenzyl)-α,α-diphenyl-4-piperidinemethanol hydrochloride.*—A mixture of 20 parts of α,α-diphenyl-4-piperidinemethanol, 13 parts of o-nitrobenzyl chloride, 120 parts of butanone, and 10 parts of powdered potassium carbonate is heated with agitation at the boiling point under reflux in the presence of a trace of sodium iodide for 26 hours. The solvent is then stripped by evaporation and the residue taken up in 525 parts of chloroform. The chloroform solution is thoroughly washed with water and then with an excess of hydrochloric acid. The solution is next treated with decolorizing charcoal and dried over anhydrous calcium sulfate. On standing, chilled, a precipitate is thrown down which, recrystallized from a mixture of ethanol and ether, affords N-(o-nitrobenzyl)-α,α-diphenyl - 4 - piperidinemethanol hydrochloride, the melting point of which is 185–187°. An additional quantity of product is recovered by diluting the chloroform mother liquor with hexane. N-(o-nitrobenzyl)-α,α-diphenyl-4-piperidinemethanol hydrochloride shows a tendency to retain solvent of crystallization, the solvated material melting considerably below the temperatures characteristic of the pure product. N-(o-nitrobenzyl)-α,α-diphenyl-4-piperidinemethanol hydrochloride has the formula

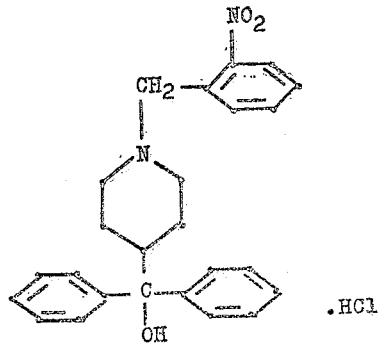

EXAMPLE 11

*N - (m-nitrobenzyl)-α,α-diphenyl-4-piperidine-methanol hydrochloride.*—A mixture of 13 parts of α,α-diphenyl-4-piperidinemethanol, 9 parts of m-nitrobenzyl chloride, 5 parts of powdered potassium carbonate, 80 parts of butanone, and a trace of sodium iodide is heated with agitation at the boiling point under reflux during 16 hours. The reaction mixture is then evaporated to a sludge, which is taken up in 450 parts of chloroform. Inorganic salts are removed by washing with water, following which the chloroform solution is thoroughly washed with an excess of hydrochloric acid. Thereupon there is deposited white crystalline N - (m-nitrobenzyl)-α,α-diphenyl-4-piperidinemethanol hydrochloride, which melts at approximately 248–249°. Recrystallization from a mixture of methanol and ether affords a solvated product melting considerably below the above figures. Solvent of crystallization is removed by vacuum drying at temperatures in the range 100–125°. N - (m-nitrobenzyl)-α,α-diphenyl-4-piperidinemethanol hydrochloride has the formula

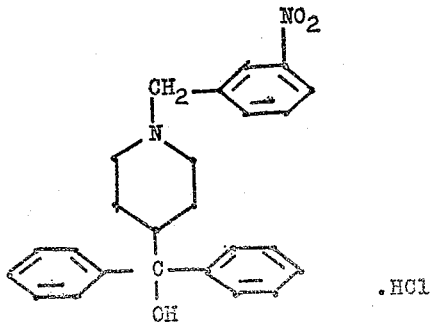

EXAMPLE 12

*N - (m-aminobenzyl)α,α-diphenyl-4-piperidinemethanol dihydrochloride.*—A suspension of 7 parts of N-(m-nitrobenzyl)-α,α-diphenyl-4-piperidinemethanol hydrochloride and 1 part of platinum oxide in 160 parts of absolute ethanol containing 1 part of hydrogen chloride dissolved in a small amount of isopropanol is maintained, with agitation, under approximately 45 p.s.i. of hydrogen until the uptake thereof indicates that the desired reduction is complete. Catalyst is then filtered out and the filtrate stripped of solvent by vacuum distillation. The ivory powder which remains is recrystallized from a mixture of methanol and ether to give pure white N-(m-aminobenzyl) - α,α-diphenyl-4-piperidinemethanol dihydrochloride, melting at 273–274° (with decomposition). The product has the formula

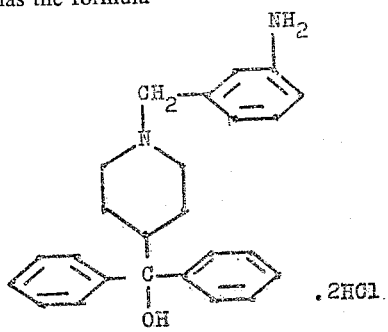

EXAMPLE 13

*N - (p-nitrobenzyl)α,α-diphenyl-2-piperidinemethanol hydrochloride.*—A mixture of 20 parts of α,α-diphenyl-2-piperidinemethanol, 13 parts of p-nitrobenzyl chloride, 8 parts of powdered potassium carbonate, and 120 parts of butanone is heated with agitation at the boiling point under reflux in the presence of a trace of sodium iodide for 24 hours. The mixture is then evaporated to a brown gummy residue which is taken up in chloroform. After washing the chloroform solution with water and then—thoroughly—with an excess of hydrochloric acid, the solvent is removed by distillation, leaving a dark brown oil. The oil is taken up in about 160 parts of methanol, the resultant solution being diluted at the boiling point with just sufficient anhydrous ether to induce crystallization. The ecru powder thrown down is N-(p-nitrobenzyl)-α,α-diphenyl-2-piperidinemethanol hydrochloride, which melts at approximately 238° (with decomposition). The product has the formula

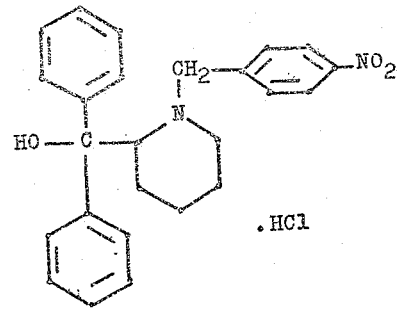

EXAMPLE 14

*N - (p-aminobenzyl)-α,α-diphenyl-2-piperidinemethanol dihydrochloride.*—A suspension of 26 parts of N-(p-nitrobenzyl)-α,α-diphenyl-2-piperidinemethanol and 3 parts of platinum oxide in 830 parts of absolute ethanol containing 2 parts of hydrogen chloride is maintained, with agitation, under approximately 45 p.s.i. of hydrogen until the uptake thereof indicates that reduction of the nitro group is complete. Catalyst is removed by filtration and the filtrate thereupon evaporated to dryness. The glasslike residue is recrystallized from a mixture of hot methanol to give the desired N-(p-aminobenzyl)-α,α-diphenyl-2-piperidinemethanol dihydrochloride as a faintly yellow crystalline product which decomposes on heating above 275°. The product has the formula

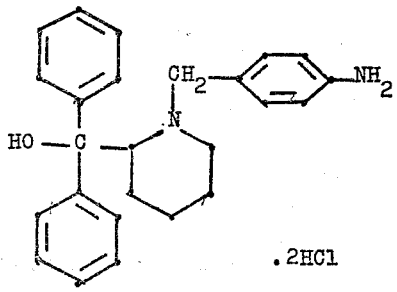

EXAMPLE 15

*N - (p-nitrophenethyl) - α,α - diphenyl-4-piperidinemethanol.*—Substitution of 20 parts of α,α-diphenyl-4-piperidinemethanol and 15 parts of p-nitrophenethyl chloride for the α,α-diphenyl-3-piperidinemethanol and p-chlorobenzyl chloride, respectively, called for in Example 4 affords, by the procedure there detailed, N-(p-nitrophenethyl)·α,α-diphenyl-4-piperidinemethanol, of the formula

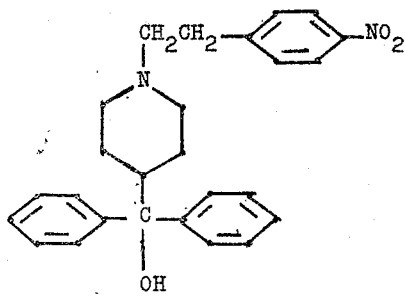

What is claimed is:
1. A compound of the formula

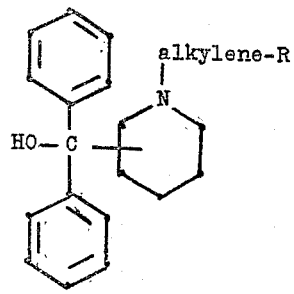

wherein the alkylene radical represented contains fewer than 3 carbon atoms and R is a member of the class consisting of radicals of the formula

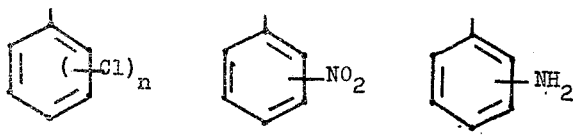

in which $n$ represents a positive integer less than 4.
2. A compound of the formula

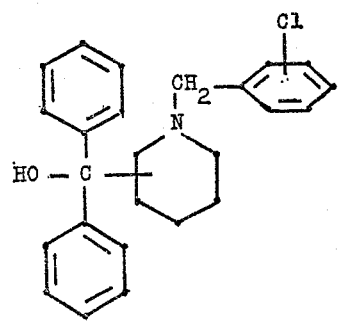

3. A compound of the formula

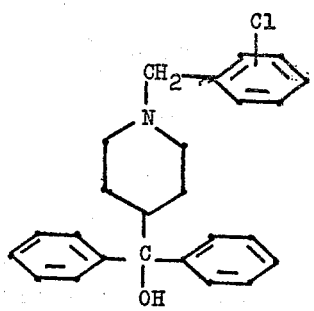

4. N - (p-chlorobenzyl) - α,α - diphenyl-4-piperidinemethanol.
5. A compound of the formula

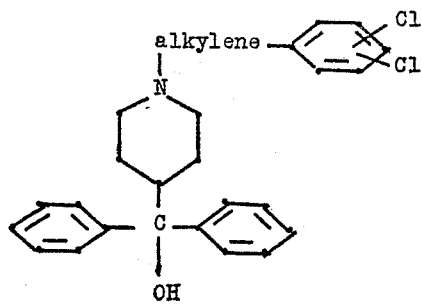

wherein the alkylene radical represented contains fewer than 3 carbon atoms.
6. A compound of the formula

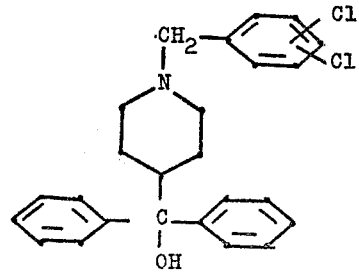

7. N-(3,4-dichlorobenzyl)-α,α-diphenyl - 4 - piperidinemethanol.
8. A compound of the formula

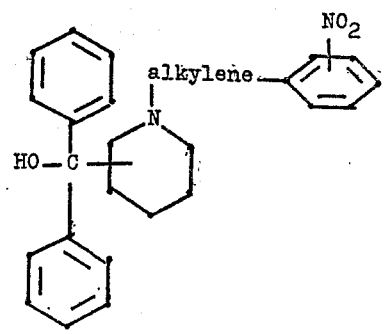

wherein the alkylene radical represented contains fewer than 3 carbon atoms.
9. A compound of the formula
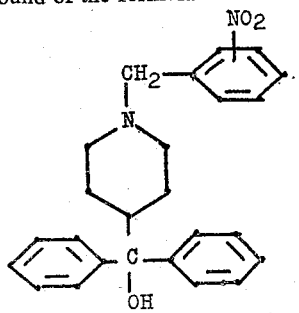
10. N-(o-nitrobenzyl) - α,α - diphenyl - 4 - piperidine-methanol.
11. A compound of the formula
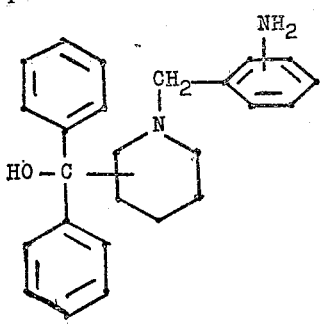
12. N-(m-aminobenzyl)-α,α-diphenyl - 4 - piperidine-methanol.
No references cited.